(12) United States Patent
Hironaga et al.

(10) Patent No.: US 7,335,848 B2
(45) Date of Patent: Feb. 26, 2008

(54) PROCESS FOR PRODUCTION OF DIE USABLE FOR FORMATION OF HONEYCOMB STRUCTURE

(75) Inventors: Masayuki Hironaga, Tokai (JP); Masanari Iwade, Nagoya (JP); Seiichiro Hayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 374 days.

(21) Appl. No.: 11/072,960

(22) Filed: Mar. 7, 2005

(65) Prior Publication Data
US 2005/0198822 A1    Sep. 15, 2005

(30) Foreign Application Priority Data
Mar. 9, 2004  (JP)  .............................. 2004-065517

(51) Int. Cl.
  *B23H 9/14*  (2006.01)
  *B23H 9/12*  (2006.01)
  *B23H 1/10*  (2006.01)

(52) U.S. Cl. .................................. 219/69.17; 219/69.14

(58) Field of Classification Search ............. 219/69.14, 219/69.15, 69.17, 69.2; 29/890
See application file for complete search history.

(56) References Cited

U.S. PATENT DOCUMENTS

| | | | |
|---|---|---|---|
| 3,699,303 A * | 10/1972 | Kauffman et al. ....... | 219/69.14 |
| 5,004,530 A * | 4/1991 | Tanaka ................... | 219/69.14 |
| 5,487,863 A * | 1/1996 | Cunningham et al. ... | 425/463 |
| 5,728,286 A | 3/1998 | Suzuki et al. | |
| 6,290,837 B1 * | 9/2001 | Iwata et al. ............. | 219/69.17 |
| 6,448,530 B1 | 9/2002 | Fujita et al. | |
| 6,621,034 B2 * | 9/2003 | Shibagaki et al. ....... | 219/69.17 |

FOREIGN PATENT DOCUMENTS

| | | |
|---|---|---|
| EP | 0759 347 A1 | 2/1997 |
| EP | 0 972 603 A2 | 1/2000 |
| JP | A 63-028520 | 2/1988 |
| JP | 8-187621 A * | 7/1996 |
| JP | 2000-723 A * | 1/2000 |
| JP | A 2000-024840 | 1/2000 |
| JP | A 2000-033521 | 2/2000 |
| JP | 2002-67022 A * | 3/2002 |
| JP | A 2002-239844 | 8/2002 |
| JP | A 2002-273626 | 9/2002 |

* cited by examiner

*Primary Examiner*—Geoffrey S. Evans
(74) *Attorney, Agent, or Firm*—Oliff & Berridge, PLC

(57) ABSTRACT

A process for producing a die for forming a honeycomb structure having slits having hexagonal honeycomb cell shape 5 at one of surfaces 7 of a plate-like base material for die 2, and backside holes 4 each communicating with respective slits 5 at the other surface 8, which comprises the steps of forming holes 3 for dielectric fluid each having an opening diameter smaller than the width of the slit 5 in a predetermined depth at the one of surfaces 7 thereof, and holes 4 communicating with holes 3 at the rest surface 8; and then passing a dielectric fluid 10 for electrical discharge machining from the surface 8 to the surface 7 via holes 3 and 4 until the machining proceeds to a position communicating with each hole 4; thereby, the slits 5 are formed at the surface 7 of the base material 2.

6 Claims, 6 Drawing Sheets

PROCESS FOR PRODUCTION OF DIE USABLE FOR FORMATION OF HONEYCOMB STRUCTURE

BACKGROUND OF THE INVENTION AND RELATED ART STATEMENT

The present invention relates to a process for producing a die usable for formation of honeycomb structure. More particularly, the present invention relates to a process for producing a die usable for formation of honeycomb structure, which can produce a die usable for forming a honeycomb structure having hexagonal honeycomb cells, easily and at a high precision.

For production of a ceramic-based honeycomb structure, there has been widely used a process which comprises extruding a clay through a die for formation of honeycomb structure, which die has, in a base material for die, backside holes for introduction of clay and slits (for example, lattice-shaped slits) communicating with the backside holes, for extrusion of clay. Ordinarily in this die, the backside holes for introduction of clay are provided at one of surfaces (clay-introducing side) of the base material for die so as to have a large opening area and, at the other (opposite) side (extrudate-leaving side) of the base material for die, slits for clay extrusion are provided, for example, in a lattice shape so as to have a small width corresponding to the thickness of each partition wall of a honeycomb structure to be produced using the die. The backside holes are ordinarily provided so as to correspond to the intersections of the slits for clay extrusion having, for example, a lattice shape and communicate with the slits inside the base material for die. Therefore, the clay made of, for example, a ceramic raw material, introduced from the backside holes moves from the clay-introducing holes of relatively large inner diameter to the slits for clay extrusion, of small width, and a formed material of honeycomb structure is extruded from the slits for clay extrusion.

For production of such a die usable for formation of a honeycomb-shaped honeycomb structure, there was disclosed, for example, a process which comprises forming slits having a hexagonal cell shape by electrical discharge machining (EDM) (JP-A-2002-273626).

In the process disclosed in JP-A-2002-273626, feeding holes (backside holes) are formed at the hole formation side of a base material for die; then, at the opposite side (slit formation side) of the base material for die are formed a plurality of preliminary holes so that the feeding holes and the preliminary holes communicate with each other; an electrode for electrical discharge machining is provided so as to face the slit formation side of the base material for die; a dielectric fluid is fed onto the slit formation side and is sent, by suction, to the hole formation side via the preliminary holes; in this state, electrical discharge machining is advanced while the discharge electrode is being moved forward; then, the machining is stopped and the discharge electrode is moved backward to expose the slits which are in the middle of formation; the dielectric fluid is injected from the hole formation side toward the slit formation side (at this time, the flow of dielectric fluid is reversed); the electrical discharge machining and the injection of the dielectric fluid in reverse flow are repeated alternately; thus, slits are formed.

DISCLOSURE OF THE INVENTION

In the above process for producing a die usable for formation of honeycomb structure, however, the electrode for electrical discharge machining (hereinafter, this electrode may be expressed as discharge electrode) is moved forward to conduct electrical discharge machining, while the dielectric fluid is sent, under suction, from the slit formation side of the base material for die to the hole formation side via the preliminary holes; therefore, the sludge generated by electrical discharge machining is carried by the dielectric fluid and passes the gap between the front end of discharge electrode and the base material for die (electrical discharge machining takes place substantially in the gap). As a result, there has been a problem in that the discharge by electrode becomes unstable, causing inferior machining). There has been a further problem in that, despite of the employment of tentative reverse flow of the dielectric fluid, it is impossible to remove the sludge which generates incessantly during electrical discharge machining. Particularly, in production of a die usable for formation of honeycomb structure having hexagonal honeycomb cells, the slit shape is complicated as compared with, for example, a tetragonal slit; therefore, the above-mentioned problems have been striking.

The present invention has been made in view of the above-mentioned problems and provides a process for producing a die usable for formation of honeycomb structure, which can give stable electric discharge by electrode and conduct normal electrical discharge machining and resultantly can produce a die usable for formation of honeycomb structure having hexagonal honeycomb cells, easily and at a high precision.

The present invention provides a process for producing a die usable for formation of honeycomb structure, described below.

[1] A process for producing a die usable for formation of honeycomb structure, which comprises forming, at one of surfaces of a plate-like base material for die, slits having a hexagonal cell shape to be used for extrusion of a honeycomb structure having hexagonal honeycomb cells and, at the other surface of the base material for die, backside holes each communicating with one of the slits, in which process holes for dielectric fluid each having an opening diameter smaller than the width of said slit are formed to a predetermined depth at said one of surfaces of the base material for die at the positions corresponding to at least one of the six vertexes of each hexagon constituting the hexagonal honeycomb shape of said honeycomb structure to be extruded; and said backside holes each communicating with said holes for dielectric fluid are formed at said other end of the base material for die, and a discharge electrode for electrical discharge machining is provided at a position apart by a predetermined distance from said one of surfaces of the base material for die in which the backside holes and the holes for dielectric fluid have been formed, so as to cover at least part of the openings of the holes for dielectric fluid; while a dielectric fluid for electrical discharge machining is being passed from said the other surface of the base material for die to said one of surfaces of the base material for die via the backside holes and the holes for dielectric fluid, electrical discharge machining is conducted at the one of surfaces of the base material for die until the machining proceeds to a position communicating with each backside hole; thereby, said slits having a hexagonal cell shape are formed at said one of surfaces of the base material for die.

[2] A process for producing a die usable for formation of honeycomb structure according to [1], wherein the holes for dielectric fluid are formed at positions corresponding to every other vertex of the six vertexes of each hexagon constituting the hexagonal honeycomb shape.

[3] A process for producing a die usable for formation of honeycomb structure according to [1] or [2], wherein the discharge electrode has a plate shape corresponding to one side of each hexagon constituting the hexagonal honeycomb cell shape.

[4] A process for producing a die usable for formation of honeycomb structure according to any of [1] to [3], wherein the dielectric fluid is fed to said the other surface of the base material for die at a pressure of 0.005 to 0.10 Mpa and passed through the backside holes and the holes for dielectric fluid.

[5] A process for producing a die usable for formation of honeycomb structure according to any of [1] to [4], wherein the hexagon constituting the hexagonal honeycomb shape of each slit is a regular hexagon.

According to the present process for production of die usable for formation of honeycomb structure, a dielectric fluid for electrical discharge machining is allowed to flow from the other surface (back side) of a base material for die to one of surfaces of the base material for die via backside holes and holes for dielectric fluid; thereby, stable discharge by electrode is made possible and normal electrical discharge machining is realized; as a result, a die usable for formation of honeycomb structure having hexagonal honeycomb cells can be produced easily and at a high precision.

BEST MODE FOR CARRYING OUT THE INVENTION

In-depth description is made below on the mode for carrying out the process of the present invention for producing a die usable for formation of honeycomb structure. However, the present invention is in no way restricted thereto and various changes, modifications and improvements can be made based on the knowledge of those skilled in the art as long as there is no deviation from the scope of the present invention.

Figure 1:
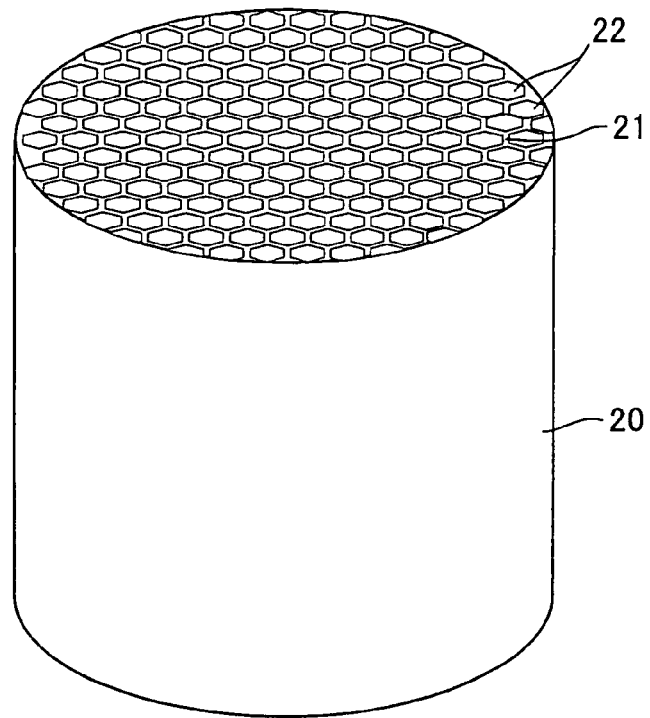
FIG. 1 is a perspective view schematically showing a honeycomb structure formed (extruded) using a die usable for formation of honeycomb structure, which die was produced according to a mode for carrying out the present process for production of die usable for formation of honeycomb structure.
Figure 2:
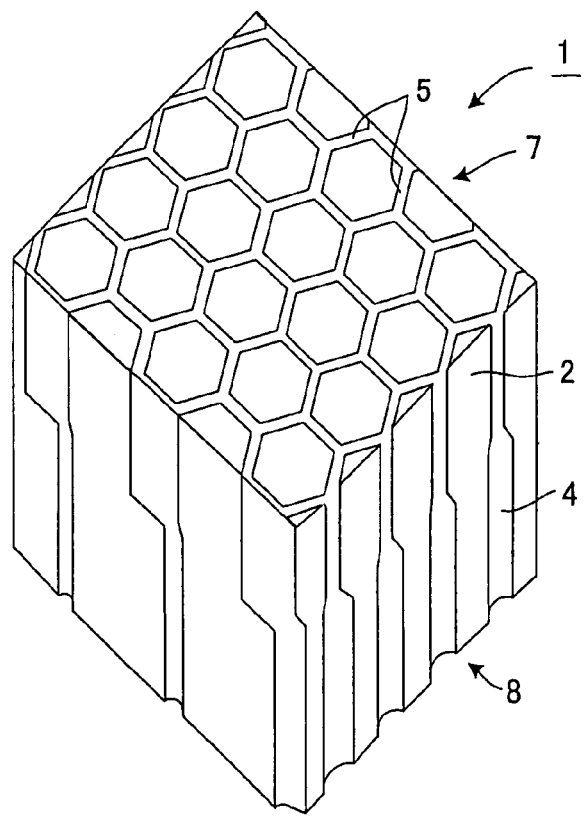
FIG. 2 is a partial perspective view schematically showing a die usable for formation of honeycomb structure, which was produced according to a mode for carrying out the present process for production of die usable for formation of honeycomb structure.

The process of the present mode for production of die usable for formation of honeycomb structure, is a process for producing a die which is used for forming, by extrusion, a honeycomb structure 20 such as shown in FIG. 1, having hexagonal passages 22 surrounded by partition walls 21. As shown in FIG. 2, the die 1 produced by the present process and usable for formation of honeycomb structure has slits having a hexagonal cell shape 5 at one of surfaces 7 of a base material for die 2 and, at the other surface 8 of the base material for die 2, backside holes 4 communicating with the slits 5.

Figure 3A:
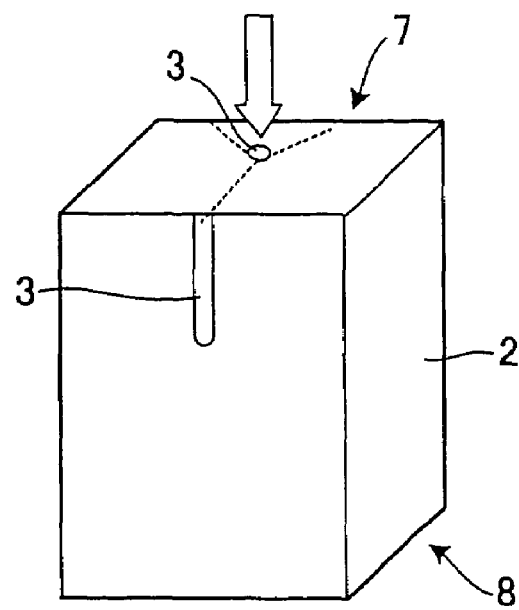
FIG. 3(a) is a perspective view schematically showing a step of forming holes for dielectric fluid in the present process for production of die usable for formation of honeycomb structure.
Figure 3B:
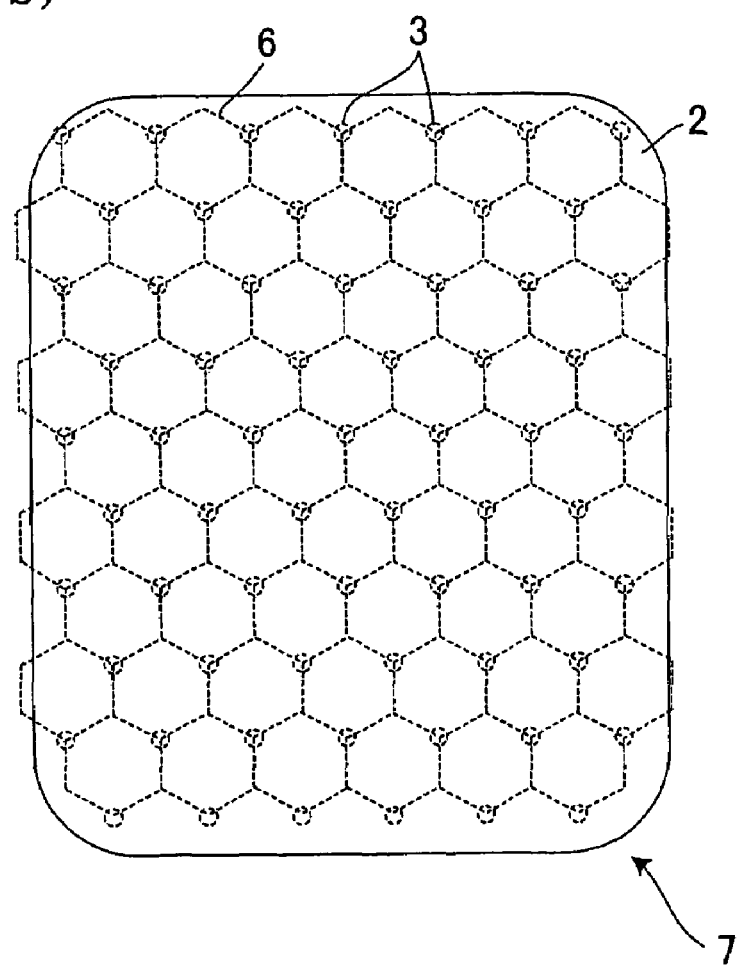
FIG. 3(b) is a plan view schematically showing the surface of a base material for die used in the step of FIG. 3(a).
Figure 4A:
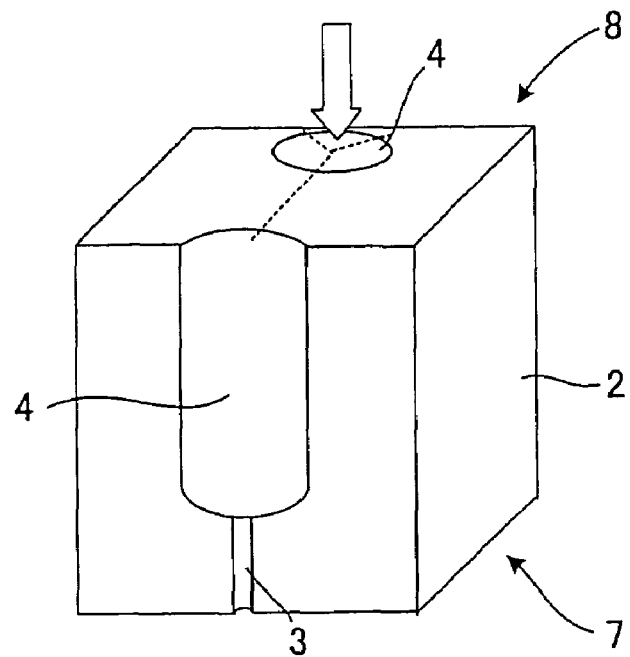
FIG. 4(a) is a perspective view schematically showing a step of forming backside holes in the present process for production of die usable for formation of honeycomb structure.
Figure 4B:
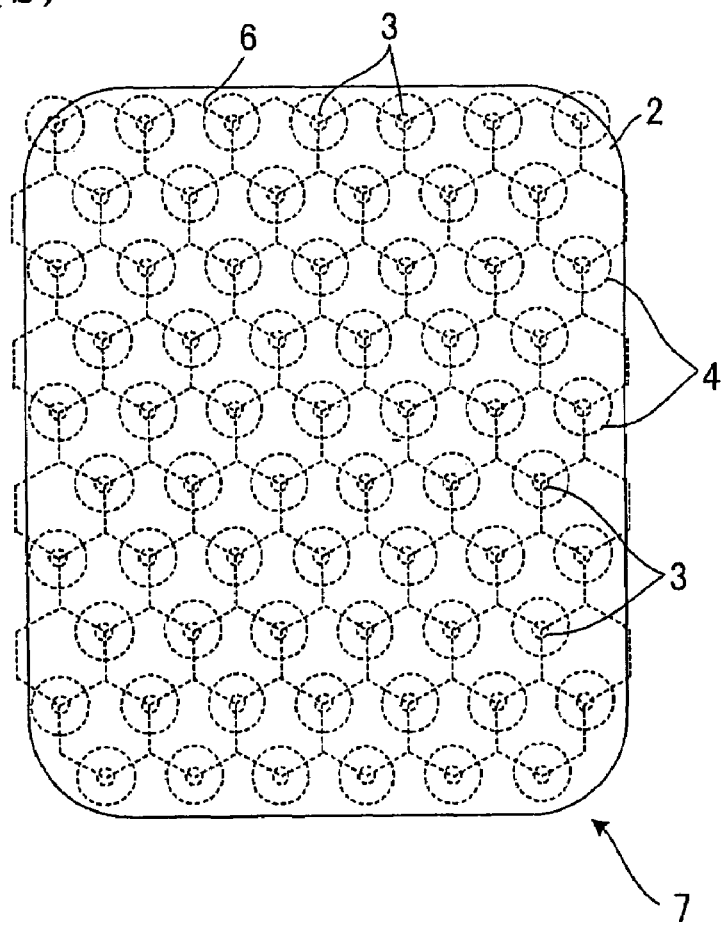
FIG. 4(b) is a plan view schematically showing the surface of a base material for die used in the step of FIG. 4(a).
Figure 5A:
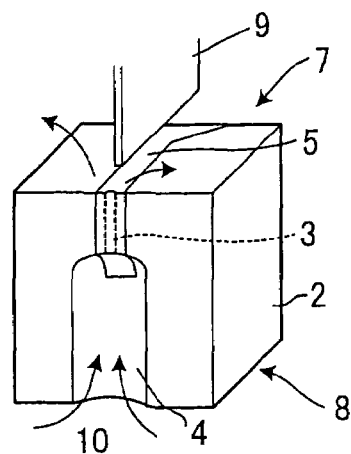
FIG. 5(a) is a perspective view schematically showing a step of forming slits in the present process for production of die usable for formation of honeycomb structure.
Figure 5B:
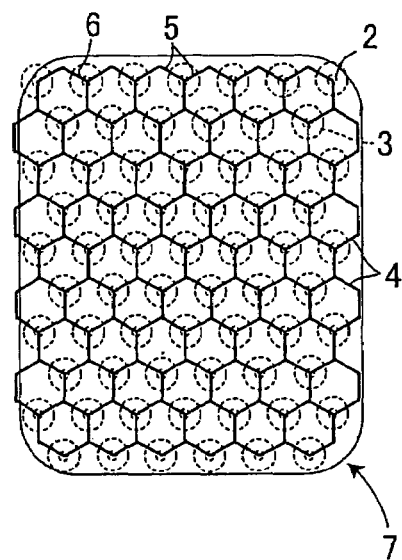
FIG. 5(b) is a plan view schematically showing the surface of a base material for die used in the step of FIG. 5(a).
Figure 5C:
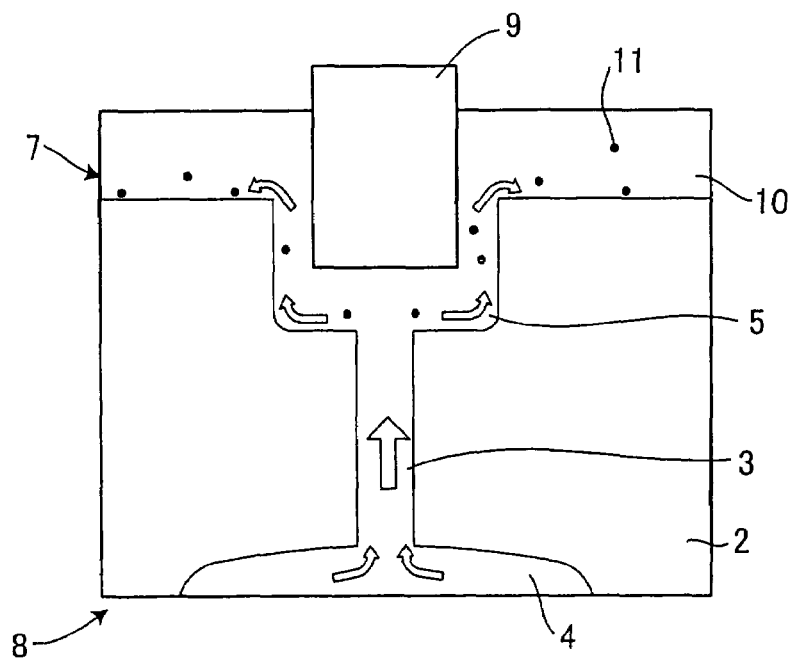
FIG. 5(c) is a sectional view of a base material for die used in the step of FIG. 5(a).

In the process for production of die usable for formation of honeycomb structure according to the present mode, there are formed, at one of surfaces 7 of a plate-like base material for die 2, slits having a hexagonal cell shape 5 for extrusion of honeycomb structure having hexagonal honeycomb cells 20 (see FIG. 1) and, at the other surface 8 of the base material for die 2, backside holes 4 communicating with the slits 5. As shown in FIGS. 3(a) and 3(b), holes 3 for dielectric fluid, each having an opening diameter smaller than the width of each slit 5 (see FIG. 2) are formed to a predetermined depth at one of surfaces 7 of a base material for die 2 at the positions corresponding to at least one vertex of the six vertexes of each hexagon constituting the hexagonal honeycomb shape of a honeycomb structure 20 (see FIG. 1) to be extruded and, as shown in FIGS. 4(a) and 4(b), backside holes 4 communicating with the holes 3 for dielectric fluid are formed at the other surface 8 of the base material for die 2; as shown in FIGS. 5(a) and 5(b), an electrode 9 for electrical discharge machining is provided at a position apart by a predetermined distance from the one of surfaces 7 of the base material for die 2 in which the backside holes 4 and the holes 3 for dielectric fluid have been formed, so as to cover at least part of the opening of each hole 3 for dielectric fluid; while a dielectric fluid 10 for electrical discharge machining is allowed to flow from the other surface 8 of the base material for die 2 to the one of surfaces 7 of the base material for die 2 via the backside holes 4 and the holes 3 for dielectric fluid, electrical discharge machining is conducted at the one of surfaces 7 of the base material for die 2 to the positions communicating with the backside holes 4; thereby, slits having a hexagonal cell shape 5 are formed at the one of surfaces 7 of the base material for die 2. Incidentally, FIG. 3(a), FIG. 4(a) and FIG. 5(a) are each a perspective view schematically showing a step of the process for production of die usable for formation of honeycomb structure according to the present mode; and FIG. 3(b), FIG. 4(b) and FIG. 5(b) are each a plan view schematically showing the surface of base material for die in the step of FIG. 3(a), FIG. 4(a) or FIG. 5(a). FIG. 5(c) is a sectional view of a base material for die in the step of FIG. 5(a). In FIG. 3(a) and FIG. 4(a) is shown a case wherein holes 3 for dielectric fluid are first formed on one of surfaces 7 of a base material for die 2 and then backside holes 4 are formed on the other surface 8 of the base material for die 2; however, in the process for production of die usable for formation of honeycomb structure according to the present mode, it is possible to first form backside holes 4 and then form holes 3 for dielectric fluid.

In the conventional production of a die for formation of a honeycomb structure having hexagonal honeycomb cells 20 such as shown in FIG. 1, electrical discharge machining for formation of slits 5 has been conducted by sucking a dielectric fluid 10 for electrical discharge machining from the other surface 8 of a base material for die 2. In this case, the sludge 11 generated by the electrical discharge machining is carried by the dielectric fluid 10 and passes through a gap between the front end of a discharge electrode 9 and the base material for die 2 (in the gap, electrical discharge machining is taking place); therefore, the discharge by the electrode 9 became unstable and inferior machining were invited. Particularly in the holes for dielectric fluid having an opening diameter smaller than the width of each slit, the sludge 11 tended to concentrate, which caused discharge against the sludge 11 and hindered normal discharge. In contrast, in the process for production of die usable for formation of honeycomb structure according to the present mode, electrical discharge machining is conducted while a dielectric fluid 10 is allowed to flow from the other surface 8 of a base material for die 2 to one of surfaces 7 of the base material for die 2 via backside holes 4 and holes 3 for dielectric fluid, as shown in FIGS. 5(*a*) to 5(*c*); as a result, the sludge 11 generating during electrical discharge machining can be discharged at the one of surfaces 7 of the base material for die 2, stable discharge by the electrode 9 is allowed to take place and normal electrical discharge machining is realized, and a die 1 usable for forming a honeycomb structure having hexagonal honeycomb cells 20 such as shown in FIG. 1 can be produced easily and at a high precision.

Next, the process for production of die usable for formation of honeycomb structure according to the present mode is explained specifically for individual steps. As shown in FIGS. 3(*a*) and 3(*b*), there are first formed holes 3 for dielectric fluid each having an opening diameter smaller than the width of each slit 5 (see FIG. 2) to be later formed in a base material for die 2, at one of surfaces 7 of the base material for die 2 and to a predetermined depth, at the positions corresponding to at least one vertex of the six vertexes of the hexagon 6 constituting the hexagonal honeycomb shape of a honeycomb structure 20 (see FIG. 1) to be extruded.

As to the method for forming the holes 3 for dielectric fluid, there is no particular restriction. However, in the process for production of die usable for formation of honeycomb structure according to the preset mode, the holes 3 can be formed by using, for example, a laser beam or by drilling.

The holes 3 for dielectric fluid are formed at the positions corresponding to at least one vertex of the six vertexes of each hexagon constituting the hexagonal honeycomb shape of a honeycomb structure 20 (see FIG. 1) to be extruded. As shown in FIGS. 3(*a*) and 3(*b*), in the present mode, the holes 3 are formed preferably at the positions corresponding to every other vertex (three vertexes) of the six vertexes of the hexagon 6 constituting the hexagonal honeycomb shape. Incidentally, the dotted line showing each hexagon 6 constituting the hexagonal honeycomb shape in FIGS. 3(*a*) and 3(*b*) shows an image of a honeycomb structure 20 (see FIG. 1) to be extruded, and is not formed in the base material for die 2 actually used in the step of FIG. 3.

As to the depth of the holes 3 for dielectric fluid, formed in the base material for die 2, there is no particular restriction. However, in the die 1 of FIG. 2 usable for formation of honeycomb structure, produced according to the present mode, the holes 3 are formed in a depth of preferably 90 to 150% relative to the depth of the slits 5 (see FIG. 2) formed in the base material for die 2, so as to ensure reliable communication with the backside holes 4.

The opening diameter of each hole 3 for dielectric fluid is smaller than the width of each slit 5 (see FIG. 2), as shown in FIG. 3(*a*). Specifically, the opening diameter of the hole 3 for dielectric fluid is preferred to be 30 to 60% of the width of the slit 5 (see FIG. 2). When the opening diameter of the hole 3 for dielectric fluid is less than 30% of the width of the slit 5 (see FIG. 2), the opening diameter of the hole 3 for dielectric fluid is too small and there is a fear that the flow amount of a dielectric fluid 10 [see FIG. 5(*a*)] is too small. Meanwhile, when the opening diameter of the hole 3 for dielectric fluid is more than 60% of the width of the slit 5 (see FIG. 2), there is a fear that the hole 3 for dielectric fluid deviates from the position at which the slit 5 (see FIG. 2) is to be formed, although this also depends upon the machining accuracies of slit 5 (see FIG. 2) and hole 3 for dielectric fluid. There is no particular restriction as to the opening diameter of the hole 3 for dielectric fluid; however, when the width of the formed slit 5 (see FIG. 2) of die 1 (see FIG. 2) for formation of honeycomb structure is, for example, 0.20 mm, the opening diameter of the hole 3 for dielectric fluid is preferred to be 0.06 to 0.12 mm.

As the base material for die 2 used in the process of the present mode for production of die usable for formation of honeycomb structure, there can be suitably used a base material for die which has been used in production of a conventional die for formation of honeycomb structure. As a preferred example thereof, there can be mentioned a plate-like metal plate having one of surfaces 7 and the other surface 8 and having such a thickness that slits having a hexagonal cell shape 5 can be formed at the one of surfaces 7 and, at the other surface 8, backside holes 4 communicating with the slits 5 can be formed. As the starting material for the base material for die 2, there is ordinarily used stainless steel or die steel.

Next, as shown in FIGS. 4(*a*) and 4(*b*), there are formed, at the other surface 8 of the base material for die 2, backside holes 4 communicating with the holes 3 for dielectric fluid. As to the method for formation of the backside holes 4, there is no particular restriction, either. However, there can be preferably used conventional methods such as electrolytic machining (STEM), electrical discharge machining (EDM) and mechanical machining (e.g. drilling). As mentioned previously, the step of forming the backside holes 4 may be conducted prior to formation of the holes 3 for dielectric fluid.

In the process of the present mode for production of die usable for formation of honeycomb structure, there is no particular restriction as to the opening diameter of each backside hole 4 formed in the base material for die 2. However, the opening diameter is preferably 0.50 to 2.00 mm. By allowing the backside hole 4 to have such an opening diameter, the die produced can feed, through each backside hole 4, a clay sufficient for formation of honeycomb structure.

Next, as shown in FIGS. 5(*a*) to 5(*c*), a discharge electrode 9 is provided at a position apart by a predetermined distance from the one of surfaces 7 of the base material for die 2 in which the backside holes 4 and the holes 3 for dielectric fluid have been formed, so as to cover at least part of the openings of the holes 3 for dielectric fluid; while a dielectric fluid 10 for electrical discharge machining is allowed to flow from the other surface 8 of the base material for die 2 to the one of surfaces 7 of the base material for die 2 via the backside holes 4 and the holes 3 for dielectric fluid, electrical discharge machining is conducted from the one of surfaces 7 of the base material for die 2 to a depth at which the front end of the discharge electrode 9 communicates with the backside holes 4; thereby, slits having a hexagonal cell shape 5 are formed at the one of surfaces 7 of the base material for die 2. There is no particular restriction as to the hexagon constituting the hexagonal honeycomb shape of the slits 5, but the hexagon is preferred to be a regular hexagon.

Figure 6:
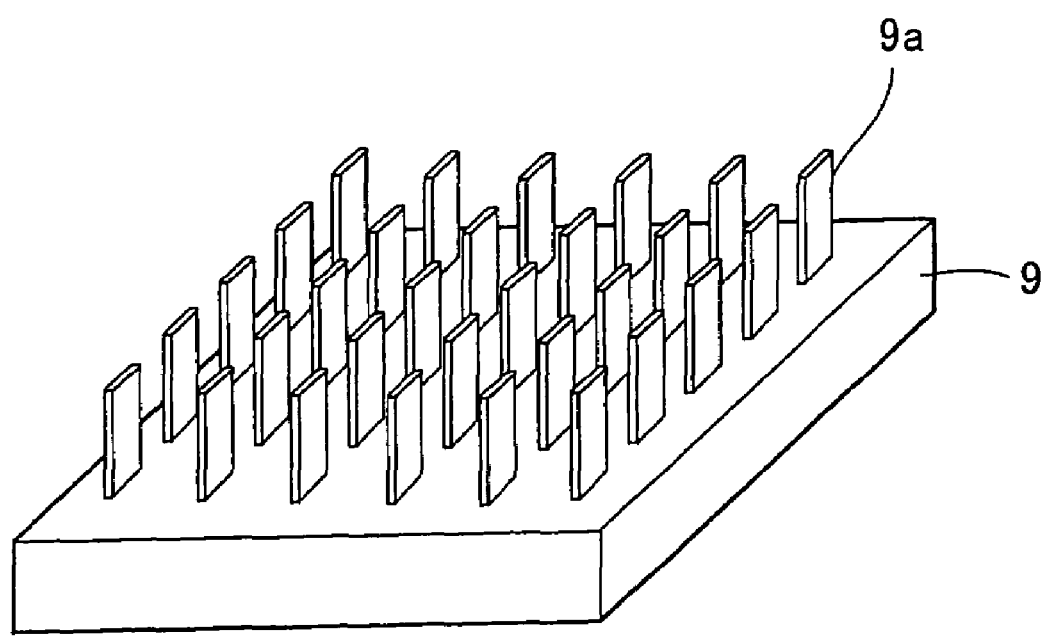
FIG. 6 is a perspective view schematically showing a discharge electrode used in the present process for production of die usable for formation of honeycomb structure.

In the electrical discharge machining conducted for formation of slits 5, there is provided, above the one of surfaces 7 of the base material for die 2 as one electrode, a discharge electrode 9 as other electrode at a position apart from the base material for die 2 by a predetermined distance; the one of surfaces 7 of the base material for die 2 is subjected to electrical discharge machining by the discharge electrode 9 and converted into a hexagonal honeycomb shape. There is no particular restriction as to the discharge electrode 9; however, there can be suitably used, for example, a discharge electrode 9 such as shown in FIG. 6, constituted by a plurality of plate electrodes 9a each corresponding to one side of each hexagon 6 constituting a hexagonal honeycomb shape [see FIG. 5(b)]. When such an electrode 9 is used, holes for dielectric fluid are formed at the positions corresponding to every other vertex (three vertexes) of the six vertexes of each hexagon 6 constituting a hexagonal honeycomb shape, as shown in FIGS. 5(a) and 5(b); first, one side of each hexagon 6 constituting a hexagonal honeycomb shape is formed by electrical discharge machining using the discharge electrode 9 constituted by a plurality of plate discharge electrodes 9a; then, the discharge electrode 9 is rotated by 60° relative to the base material for die 2 and the other side of the hexagon 6 is formed by electrical discharge machining. This operation is repeated until all the six sides of each hexagon 6 are formed, whereby slits 5 are formed. As a specific method, there can be suitably used a method for production of honeycomb die, disclosed in JP-B-1992-74131. When, as described previously, holes 3 for dielectric fluid are formed at the positions corresponding to every other vertex (three vertexes) of the six vertexes of the hexagon 6, the discharge electrode 9 constituted by a plurality of plate discharge electrodes 9a can be provided so as to cover at least part of the openings of the holes 3 for dielectric fluid, in each case of forming one side of the hexagon 6 by electrical discharge machining using the electrode 9, and the dielectric fluid can be allowed to flow efficiently to the one of surfaces 7 of the base material for die 2. As the discharge electrode, there may be used a discharge electrode having a plate shape corresponding to the shape of slits to be formed. When such a discharge electrode for preparing a die usable for forming a honeycomb structure having hexagonal cells (not depicted) is used, the electrode is provided above one of surfaces of the base material for die at a position apart therefrom by a predetermined distance so that part of each front end of the electrode is at each opening of the holes for dielectric fluid; the discharge electrode is allowed to approach gradually and electrical discharge machining is advanced from the one of surfaces of the base material for die; thereby, slits having a hexagonal cell shape are formed.

As the dielectric fluid 10 used in the process of the present mode of FIGS. 5(a) to 5(c) for production of die usable for formation of honeycomb structure, there can be suitably used a dielectric fluid conventionally used in electrical discharge machining.

When the dielectric fluid 10 for electrical discharge machining is allowed to flow from the other surface 8 of the base material for die 2 to the one of surfaces 7 of the base material for die 2 via the backside holes 4 and the holes 3 for dielectric fluid, it is preferred that the dielectric fluid 10 is injected from the other surface 8 of the base material for die 2 using a pump or the like to allow the solution 10 to flow to the one of surfaces 7 of the base material for die 2. There is no particular restriction as to the pressure at which the dielectric fluid 10 is injected; however, it is preferably to make the dielectric fluid 10 injected at such a pressure capable of carrying the sludge 11 generated by electrical discharge machining forcibly to the one of surfaces 7 of the base material for die 2 as 0.005 to 0.10 Mpa, for example. Incidentally, a preferred range of the pressure at which the dielectric fluid 10 is injected, varies depending upon the rib width of the discharge electrode 9 used (the intended width of slits to be formed), and the pressure at which the dielectric fluid 10 is injected, can be increased as the rib width of discharge electrode 9 becomes larger. For example, when the rib width of the discharge electrode 9 used (the intended width of slits to be formed) is about 0.08 to 0.13 mm, it is preferred that the dielectric fluid 10 is injected at 0.005 to 0.050 Mpa.

Thus, stable discharge by the electrode 9 is made possible and normal electrical discharge machining can be realized, whereby a die usable for formation of honeycomb structure having hexagonal honeycomb cells can be produced easily and at a high precision.

The present invention is described more specifically below by way of Examples. However, the present invention is in no way restricted to the following Examples.

EXAMPLE 1

About 10,000 holes for dielectric fluid, each having an opening diameter of 80 μm were formed to a depth of 1.6 mm, at one of surfaces of a plate-like base material for die of 180 mm×180 mm×20 mm (thickness), made of stainless steel, at the positions corresponding to every other vertex (three vertexes) of the six vertexes of each hexagon constituting the hexagonal honeycomb shape of a honeycomb structure to be extruded. Then, at the other surface of the base material for die in which the holes for dielectric fluid have been formed, there were formed backside holes each having an opening diameter of 0.70 mm so that they communicated with the holes for dielectric fluid. Then, a discharge electrode was provided at a position apart from the one of surfaces of the base material for die by a predetermined distance, so as to cover at least part of the openings of the holes for dielectric fluid; while a dielectric fluid for electrical discharge machining was allowed to flow from the other surface of the base material for die to the one of surfaces of the base material for die via the backside holes and the holes for dielectric fluid, electrical discharge machining was conducted from the one of surfaces of the base material for die until the machining reached the backside holes, to form slits having a hexagonal cell shape at the one of surfaces of the base material for die; thereby, a die usable for formation of honeycomb structure was formed. In the present Example, electrical discharge machining was conducted using an NC electric spark machine. The dielectric fluid used was an ordinary dielectric fluid for electrical discharge machining and the solution was allowed to flow to the one of surfaces of the base material for die at a pressure of 0.01 Mpa using a pump. Incidentally, in the present Example, production of die usable for formation of honeycomb structure was conducted twice according to the above-mentioned procedure.

COMPARATIVE EXAMPLE 1

A die usable for formation of honeycomb structure was produced in the same manner as in Example 1 except that electrical discharge machining was conducted while the dielectric fluid for electrical discharge machining was allowed to flow, by sucking, from the one of surfaces of the base material for die to the other surface of the base material for die via the holes for dielectric fluid and the backside holes. Incidentally, in Comparative Example 1, production of die usable for formation of honeycomb structure was conducted twice according to the above-mentioned procedure.

COMPARATIVE EXAMPLE 2

Backside holes were formed at the other surface of a base material for die and no hole for dielectric fluid was formed at one of surfaces of the base material for die. At the one of surfaces of the base material for die in which the backside holes had been formed, electrical discharge machining was conducted directly to form slits to form a die usable for formation of honeycomb structure. The size and shape of the die for formation of honeycomb structure, produced in Comparative Example 2 were the same as those of the die for formation of honeycomb structure, produced in Example 1. Incidentally, in Comparative Example 2, production of die usable for formation of honeycomb structure was conducted twice according to the above-mentioned procedure.

Figure 7:
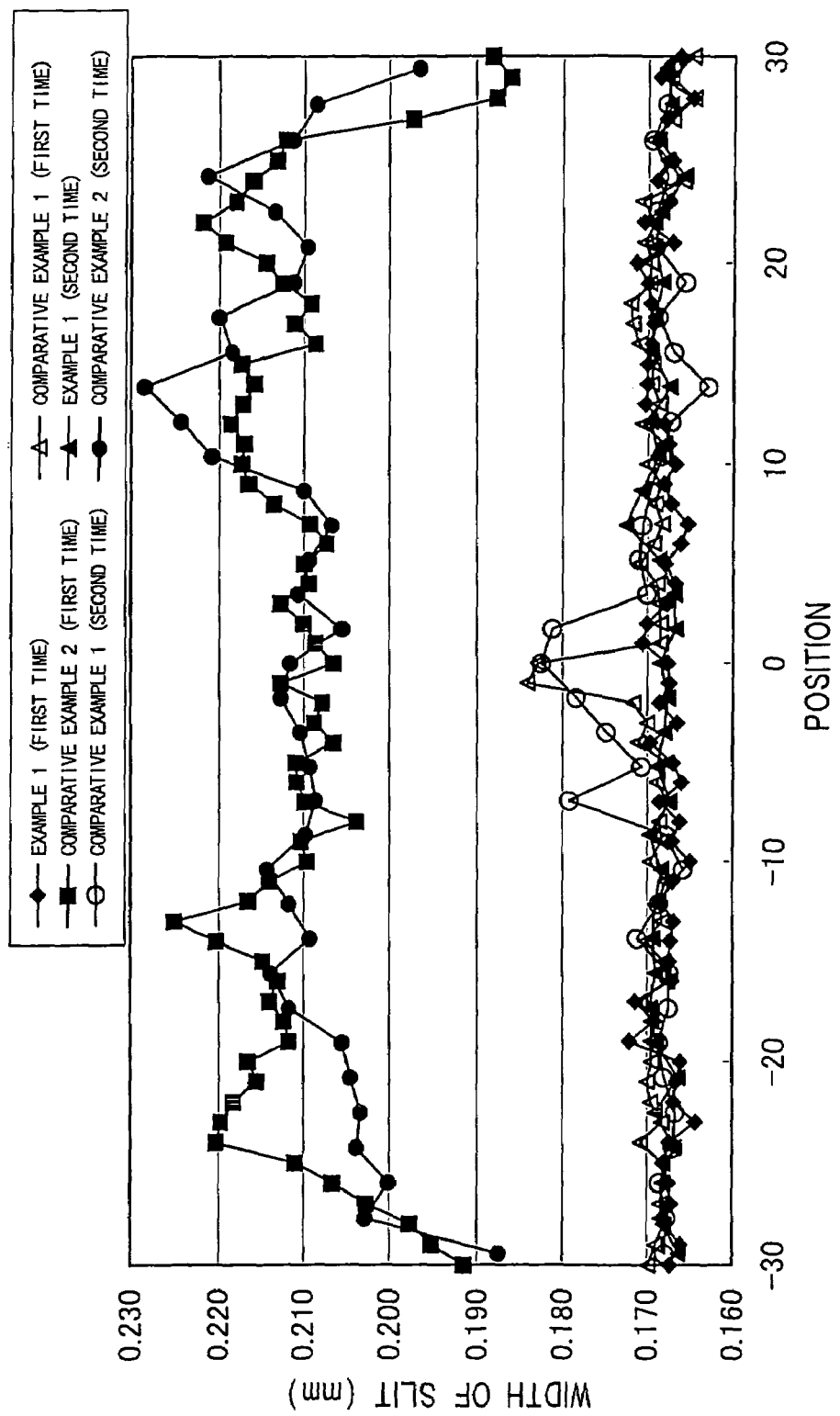
FIG. 7 is a graph showing a relation between the width of slit and the position of slit in die, of the dies for formation of honeycomb structure produced in the Examples.

Each two dies for formation of honeycomb structure, produced in Example 1, Comparative example 1 and Comparative Example 2 were examined as to the width of slit and the position of slits in die for formation of honeycomb structure, using a microscope. The results of measurements as to the widths of the respective slits are shown in Table 1 and Table 2 in terms of mm. FIG. 7 is a graph showing a relation between the width of slits of die for formation of honeycomb structure and the position of slits in die usable for formation of honeycomb structure. In FIG. 7, the ordinate indicates the width (mm) of slits in die for formation of honeycomb structure and the abscissa indicates the position of slits in die for formation of honeycomb structure.

TABLE 1

| Position (slit) | Ex. 1 First time | Comp. Ex. 1 First time | Comp. Ex. 2 First time |
|---|---|---|---|
| −30 | 0.167 | 0.170 | 0.191 |
| −29 | 0.166 | 0.169 | 0.195 |
| −28 | 0.168 | 0.168 | 0.198 |
| −27 | 0.167 | 0.169 | 0.203 |
| −26 | 0.168 | 0.168 | 0.207 |
| −25 | 0.168 | 0.168 | 0.211 |
| −24 | 0.168 | 0.171 | 0.220 |
| −23 | 0.164 | 0.168 | 0.220 |
| −22 | 0.167 | 0.170 | 0.218 |
| −21 | 0.167 | 0.170 | 0.216 |
| −20 | 0.166 | 0.169 | 0.216 |
| −19 | 0.172 | 0.170 | 0.212 |
| −18 | 0.169 | 0.169 | 0.212 |
| −17 | 0.171 | 0.171 | 0.214 |
| −16 | 0.167 | 0.168 | 0.213 |
| −15 | 0.167 | 0.168 | 0.215 |
| −14 | 0.167 | 0.170 | 0.220 |
| −13 | 0.167 | 0.168 | 0.225 |
| −12 | 0.169 | 0.169 | 0.216 |
| −11 | 0.167 | 0.168 | 0.214 |
| −10 | 0.165 | 0.170 | 0.210 |
| −9 | 0.167 | 0.168 | 0.210 |
| −8 | 0.166 | 0.169 | 0.204 |
| −7 | 0.169 | 0.168 | 0.210 |
| −6 | 0.166 | 0.169 | 0.211 |
| −5 | 0.167 | 0.168 | 0.211 |
| −4 | 0.170 | 0.171 | 0.207 |
| −3 | 0.167 | 0.170 | 0.209 |
| −2 | 0.169 | 0.172 | 0.208 |
| −1 | 0.168 | 0.184 | 0.213 |
| 0 | 0.168 | 0.183 | 0.206 |
| 1 | 0.171 | 0.168 | 0.209 |
| 2 | 0.170 | 0.169 | 0.210 |
| 3 | 0.168 | 0.169 | 0.213 |
| 4 | 0.167 | 0.169 | 0.209 |
| 5 | 0.168 | 0.171 | 0.210 |
| 6 | 0.166 | 0.169 | 0.207 |
| 7 | 0.165 | 0.168 | 0.209 |
| 8 | 0.167 | 0.169 | 0.213 |
| 9 | 0.168 | 0.168 | 0.216 |
| 10 | 0.167 | 0.170 | 0.217 |
| 11 | 0.168 | 0.168 | 0.217 |
| 12 | 0.168 | 0.171 | 0.219 |
| 13 | 0.170 | 0.169 | 0.217 |
| 14 | 0.170 | 0.170 | 0.216 |
| 15 | 0.170 | 0.169 | 0.217 |
| 16 | 0.170 | 0.171 | 0.209 |
| 17 | 0.169 | 0.172 | 0.211 |
| 18 | 0.170 | 0.172 | 0.209 |
| 19 | 0.170 | 0.170 | 0.212 |
| 20 | 0.171 | 0.170 | 0.214 |
| 21 | 0.167 | 0.170 | 0.219 |
| 22 | 0.171 | 0.169 | 0.222 |
| 23 | 0.168 | 0.171 | 0.218 |
| 24 | 0.169 | 0.166 | 0.216 |
| 25 | 0.167 | 0.168 | 0.213 |
| 26 | 0.169 | 0.170 | 0.212 |
| 27 | 0.168 | 0.167 | 0.197 |
| 28 | 0.165 | 0.165 | 0.188 |
| 29 | 0.169 | 0.167 | 0.186 |
| 30 | 0.166 | 0.165 | 0.188 |

TABLE 2

| Position (slit) | Ex. 1 Second time | Comp. Ex. 1 Second time | Comp. Ex. 2 Second time |
|---|---|---|---|
| −29.447 | 0.166 | 0.168 | 0.188 |
| −27.715 | 0.168 | 0.168 | 0.203 |
| −25.983 | 0.168 | 0.169 | 0.200 |
| −24.251 | 0.167 | 0.167 | 0.204 |
| −22.519 | 0.169 | 0.167 | 0.203 |
| −20.786 | 0.166 | 0.168 | 0.204 |
| −19.054 | 0.169 | 0.169 | 0.206 |
| −17.322 | 0.170 | 0.168 | 0.212 |
| −15.590 | 0.169 | 0.167 | 0.214 |
| −13.858 | 0.169 | 0.171 | 0.209 |
| −12.125 | 0.169 | 0.169 | 0.212 |
| −10.393 | 0.168 | 0.166 | 0.214 |
| −8.661 | 0.170 | 0.168 | 0.210 |
| −6.929 | 0.167 | 0.179 | 0.209 |
| −5.197 | 0.169 | 0.171 | 0.209 |
| −3.464 | 0.168 | 0.175 | 0.210 |
| −1.732 | 0.168 | 0.178 | 0.213 |
| 0.000 | 0.168 | 0.183 | 0.212 |
| 1.732 | 0.167 | 0.181 | 0.206 |

TABLE 2-continued

| Position (slit) | Ex. 1 Second time | Comp. Ex. 1 Second time | Comp. Ex. 2 Second time |
| --- | --- | --- | --- |
| 3.464 | 0.167 | 0.170 | 0.211 |
| 5.197 | 0.169 | 0.171 | 0.209 |
| 6.929 | 0.172 | 0.171 | 0.207 |
| 8.661 | 0.171 | 0.170 | 0.210 |
| 10.393 | 0.169 | 0.168 | 0.221 |
| 12.125 | 0.170 | 0.167 | 0.224 |
| 13.858 | 0.168 | 0.163 | 0.229 |
| 15.590 | 0.170 | 0.167 | 0.218 |
| 17.322 | 0.169 | 0.169 | 0.220 |
| 19.054 | 0.168 | 0.166 | 0.211 |
| 20.786 | 0.169 | 0.169 | 0.210 |
| 22.519 | 0.168 | 0.169 | 0.213 |
| 24.251 | 0.166 | 0.168 | 0.221 |
| 25.983 | 0.169 | 0.169 | 0.211 |
| 27.715 | 0.167 | 0.168 | 0.209 |
| 29.447 | 0.168 | 0.167 | 0.197 |

As shown in Table 1, Table 2 and FIG. 7, the die usable for formation of honeycomb structure, produced in Example 1 was small in width of slit and also in fluctuation of the width, and superior in machining precision. The die usable for formation of honeycomb structure, produced in Comparative Example 1 showed fluctuation in width of slit. The die usable for formation of honeycomb structure, produced in Comparative Example 2 was large in width of slit and also in fluctuation of the width.

INDUSTRIAL APPLICABILITY

The present process for producing a die usable for formation of honeycomb structure can produce a die usable for formation of honeycomb structure having hexagonal honeycomb cells, easily and at a high precision.

What is claimed is:

1. A process for producing a die usable for formation of a honeycomb structure, which comprises forming, at one of surfaces of a plate-like base material for die, slits having a hexagonal cell shape to be used for extrusion of a honeycomb structure having hexagonal honeycomb cells and, at the rest surface of the base material for die, backside holes each communicating with one of the slits, in which process holes for dielectric fluid each having an opening diameter smaller than the width of said slit are formed to a predetermined depth at said one of surfaces of the base material for die at the positions corresponding to at least one of the six vertexes of each hexagon constituting the hexagonal honeycomb shape of said honeycomb structure to be extruded; and said backside holes each communicating with said holes for dielectric fluid are formed at said other end of the base material for die, and a discharge electrode for electrical discharge machining is provided at a position apart by a predetermined distance from said one of surfaces of the base material for die in which the backside holes and the holes for dielectric fluid have been formed, so as to cover at least part of the openings of the holes for dielectric fluid; while a dielectric fluid for electrical discharge machining is being passed from said the other surface of the base material for die to said one of surfaces of the base material for die via the backside holes and the holes for dielectric fluid, electrical discharge machining is conducted at the one of surfaces of the base material for die until the machining proceeds to a position communicating with each backside hole; thereby, said slits having a hexagonal cell shape are formed at said one of surfaces of the base material for die.

2. A process for producing a die usable for formation of honeycomb structure according to claim 1, wherein the holes for dielectric fluid are formed at positions corresponding to every other vertex of the six vertexes of each hexagon constituting the hexagonal honeycomb shape.

3. A process for producing a die usable for formation of honeycomb structure according to claim 1, wherein the discharge electrode has a plate shape corresponding to one side of each hexagon constituting the hexagonal honeycomb shape.

4. A process for producing a die usable for formation of honeycomb structure according to claim 1, wherein the dielectric fluid is fed to said the other surface of the base material for die at a pressure of 0.005 to 0.10 Mpa and passed through the backside holes and the holes for dielectric fluid.

5. A process for producing a die usable for formation of honeycomb structure according to claim 2, wherein the dielectric fluid is fed to said the other surface of the base material for die at a pressure of 0.005 to 0.10 Mpa and passed through the backside holes and the holes for dielectric fluid.

6. A process for producing a die usable for formation of honeycomb structure according to claim 1, wherein the hexagon constituting the hexagonal honeycomb shape of each slit is a regular hexagon.

* * * * *